United States Patent [19]

Ueda et al.

[11] Patent Number: 4,923,974
[45] Date of Patent: May 8, 1990

[54] 2,6-DICYANO-4'-MORPHOLINOAZOBENZENE COMPOUNDS USEFUL FOR DYEING HYDROPHOBIC MATERIALS

[75] Inventors: Yasuyoshi Ueda; Hideo Hattori; Jun Yamamoto, all of Osaka; Kiyoyasu Hashimoto, Nara, all of Japan

[73] Assignee: Sumitomo Chemical Company, Limited, Osaka, Japan

[21] Appl. No.: 221,223

[22] Filed: Jul. 19, 1988

[30] Foreign Application Priority Data

Aug. 4, 1987 [JP] Japan .................... 62-195532

[51] Int. Cl.⁵ .............. C09B 29/34; C09B 29/01; D06P 1/18; D06P 3/54
[52] U.S. Cl. .................... 534/799; 534/597; 534/887
[58] Field of Search ............ 534/799, 791, 597

[56] References Cited

U.S. PATENT DOCUMENTS 4,045,430  8/1977  Hamprecht .......... 534/799

FOREIGN PATENT DOCUMENTS 50-2727  1/1975  Japan .................. 534/799

Primary Examiner—Floyd D. Higel
Assistant Examiner—Fiona T. Powers
Attorney, Agent, or Firm—Darby & Darby

[57] ABSTRACT

A monoazo compound of the following formula,

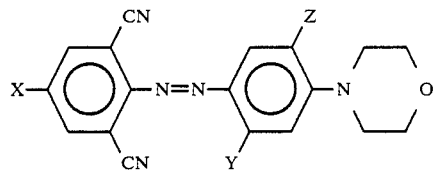

wherein X is a hydrogen or halogen atom, or a $C_{1-4}$ alkyl, $C_{1-4}$ alkoxy, $C_{1-4}$ alkylsulfonyl, $C_{1-4}$ alkylcarbonyl, $C_{1-4}$ alkoxycarbonyl, nitro, cyano or trifluoromethyl group, Y is a hydrogen or chlorine atom or a methyl or acylamino group, and Z is a hydrogen or chlorine atom or a methyl, methoxy or ethoxy group, which is useful for dyeing or printing hydrophobic fibers with superior level dyeing and build-up properties to give dyed products of a brilliant color superior in fastness properties.

4 Claims, No Drawings

2,6-DICYANO-4'-MORPHOLINOAZOBENZENE COMPOUNDS USEFUL FOR DYEING HYDROPHOBIC MATERIALS

The present invention relates to monoazo compounds. More specifically, the invention relates to monoazo compounds having a morpholinophenyl moiety as their coupling component, which may be useful as disperse dyes for dyeing or printing hydrophobic fibers, particularly those such as polyester fibers and the like.

Anthraquinone disperse dyes such as C.I. Disperse Red 60, C.I. Disperse Blue 56 and the like, have been extensively used to obtain dyed products of polyester fibers of a fast and brilliant color without any dyeing speck, in other words, with a superior level dyeing property. However, the anthraquinone disperse dyes are low in their color value and moreover inferior in their build-up property, so that dyed products of a deep color can hardly be obtained at reasonable cost.

Azo disperse dyes such as C.I. Disperse Red 343, C.I. Disperse Blue 165 have been developed in order to solve the above-said problems. These azo disperse dyes are comparable to the anthraquinone dyes in their brilliancy of color, but have never come to supersede the anthraquinone dyes because of inferior fastness and level dyeing properties.

On the other hand, Published Unexamined Japanese Patent Application No. 50-2726 and French Patent No. 2,126,120 disclosed monoazo disperse dyes obtainable using aniline or aniline compounds as the diazo component and phenylmorpholine compounds as the coupling component, which are, however, left unsolved particularly in the brilliancy of color.

The present inventors have undertaken extensive studies to find a compound useful as disperse dyes superior in level dyeing and build-up properties and capable of giving dyed products of fast and brilliant color, and as a result have found in fact that a specific monoazo compound can meet such needs.

The present invention provides a monoazo compound represented by the following formula (I),

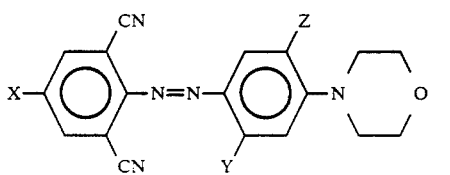

wherein X is a hydrogen or halogen atom, or a $C_{1-4}$ alkyl, $C_{1-4}$ alkoxy, $C_{1-4}$ alkylsulfonyl, $C_{1-4}$ alkylcarbonyl, $C_{1-4}$ alkoxycarbonyl, nitro, cyano or trifluoromethyl group, Y is a hydrogen or chlorine atom or a methyl or acylamino group, and Z is a hydrogen or chlorine atom or a methyl, methoxy or ethoxy group, and a process for producing the monoazo compound of the formula (I), which comprises diazotizing an aniline compound represented by the following formula (II),

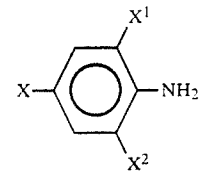

wherein X is as defined above, $X^1$ is a halogen atom, and $X^2$ is a cyano group or a halogen atom, coupling the resulting diazonium compound with a phenylmorpholine compound represented by the following formula (III),

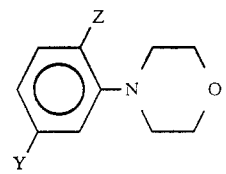

wherein Y and Z are as defined above, to obtain the corresponding o-halogenomonoazo compound represented by the following formula (IV),

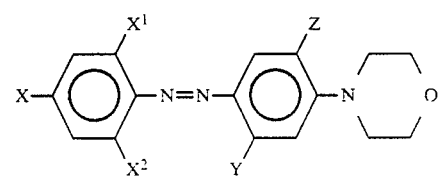

wherein X, $X^1$, $X^2$, Y and Z are as defined above, and reacting the resulting o-halogenomonoazo compound with a metal cyanide.

The present invention also provides a process for dyeing or printing hydrophobic fibers, which comprises using the monoazo compound of the formula (I).

In the present invention, the halogen atom includes chlorine, bromine, iodine and the like. The $C_{1-4}$ alkyl group represented by the symbol X in the formula (I) includes a straight or branched alkyl group having 1 to 4 carbon atoms, which may be substituted by a halogen atom, or a $C_{1-4}$ alkoxy, $C_{1-4}$ alkoxycarbonyl, hydroxy, cyano or primary, secondary or tertiary amino group, in which the hydroxy or primary or secondary amino group may be acylated by a $C_{1-4}$ aliphatic or aromatic carboxylic or sulfonic acid. The acylamino group represented by the symbol Y can be represented, for example, by the following formula,

—NHCOR wherein R is a $C_{1-4}$ alkyl, $C_{1-4}$ alkoxy, amino, chloromethyl or chloroethyl group.

Among the monoazo compounds of the formula (I), preferred are those having the halogen atom such as chlorine or bromine, or $C_{1-4}$ alkyl or nitro group as X, the methyl or acylamino group as Y, and hydrogen atom as Z. More specifically, particularly preferred are those having $C_{1-4}$ alkyl such as methyl, ethyl, n- or i-propyl and n-, i-, s- or t-butyl as X and the acylamino such as acetylamino and propionylamino as Y, and those having halogen such as chlorine and bromine as X and methyl as Y.

The monoazo compound of the formula (I) can be readily produced in a manner disclosed, for example, in the specification of Published Examined Japanese Patent Application No. 45-785. Preferably, the monoazo compound (I) can be produced in a manner such that the aniline compound of the formula (II) is diazotized in a manner known per se, the resulting diazonium compound is then coupled with the phenylmorpholine compound of the formula (III) to obtain the o-halogenomonoazo compound of the formula (IV), and thereafter the o-halogenomonoazo compound is subjected to reaction with the metal cyanide such as cuprous cyanide or zinc cyanide, thereby substituting the halogen with the cyano group. The coupling reaction can be carried out usually at a temperature of about 0° C. to about 15° C. within a pH ranging from about 1 to about 5, and the reaction between the o-halogenomonoazo compound and the metal cyanide can be carried out usually at a temperature of about 15° C. to about 150° C. in a solvent such as dimethylsulfoxide, formamide, N,N-dimethylformamide, N-methylpyrrolidone, pyridine, quinoline, acetonitrile, hexamethylphosphoric triamide, or water containing surface active compounds such as a condensate of naphthalenesulfonic acid and formaldehyde, polyethyleneglycol and the like.

The phenylmorpholine compound of the formula (III) can readily be prepared in a manner known per se as disclosed in, for example, Kogyo Kagaku Zasshi (Industrial Chemical Magazine), vol. 59 (1956), p. 909–912, or Dyes and Pigments, vol. 8 (1987), p. 63–69.

The monoazo compound of the formula (I) obtained in accordance with the present invention may be useful as disperse dyes for dyeing or printing hydrophobic fiber materials, particularly those such as polyester fiber materials. In utilizing the present monoazo compound (I) as the disperse dye, it can be finely pulverized in an aqueous medium in a known manner, for example, using a dispersing agent such as a condensate of naphthalenesulfonic acid and formaldehyde, lignosulfonic acid and the like, thereby obtaining a dye dispersion liquor. The thus obtained dye dispersion liquor can be used as it is, or made into a pulverulent product by spray-drying or the like.

The dyeing of hydrophobic fiber materials can be carried in a conventional manner. For example, the hydrophobic fiber materials are dipped in an aqueous dye bath, and the dyeing can be performed under pressure at a temperature of 105° C. or higher, preferably from 110° to 140° C. The dyeing can be also performed in the presence of a carrier such as o-phenylphenol, trichlorobenzene and the like at a relatively high temperature such as water-boiling temperature. Alternatively, a so-called thermosol dyeing can be carried out by padding cloth with the dye dispersion liquor and dry-heating the cloth at a temperature of 150° to 230° C. for 30 to 60 seconds.

In carrying out the printing, the dye dispersion liquor can be mixed with stock paste to prepare a printing paste. Cloth can be printed with the printing paste, followed by steaming or thermosol treatment.

In addition, a solvent dyeing can also be applied therefor using an organic solvent such as trichloroethylene, perchloroethylene and the like.

The dyed product can be, if desired, subjected to after-finish such as softener finishing, water-repellent finishing, hand-touch improver finishing, antistatic finish, sanitary finish and the like.

The dyed products obtained by dyeing or printing the hydrophobic fiber materials using the present monoazo compound of the formula (I) can be characterized by superior various fastness properties such as light fastness, sublimation fastness, washing fastness and the like, particularly light fastness. These fastness properties, particularly washing fastness, cannot be deteriorated even after the after-finish as described above.

The present monoazo compound of the formula (I) can be characterized by superior dye performances, particularly those such as color yield, build-up and level-dyeing properties, so that dyed products of a brilliant deep color can be obtained without uneven dyeing. These characteristics are significant on the dyeing and finishing.

A combination of a red monoazo compound and a blue one selected from those represented by the formula (I) can give dyed products of a brilliant deep medium color such as gray, violet and the like, with superior fastness and even dyeing properties. Moreover, the present monoazo compound of the formula (I) can be blended with any yellow dye selected from those of pyridine azo, pyrazolone azo or quinophthalone types to give dyed products of any desired color with the superior properties as described above.

The present invention is illustrated in more detail with reference to the following Examples, which are only illustrative and not intended to limit the scope of the present invention. In Examples, parts are by weight.

EXAMPLE 1

2,6-Dibromo-4-methylaniline (16 parts) was dispersed in 60% sulfuric acid (100 parts). To the dispersion was added 43% nitrosylsulfuric acid (18 parts) while keeping the temperature within a range of 35° to 40° C., to perform diazotization. The resulting diazonium salt solution was added dropwise to a 5% hydrochloric acid solution (100 parts) containing 3-acetylaminophenylmorpholine (13 parts), while keeping the temperature within a range of 0° to 5° C. After adjusting the pH value to 5 by the addition of sodium carbonate, the reaction product was collected on a filter and washed to obtain the corresponding o-halogenomonoazo compound (25 parts).

The o-halogenomonoazo compound (10 parts) was dissolved in a mixed solvent of N,N-dimethylformamide (90 parts) and pyridine (30 parts). Cuprous cyanide (4.2 parts) was added to the solution, and the mixture was allowed to react with each other at 80° C. for 8 hours. After cooling, the reaction mixture was mixed with a methanol solution (60 parts) containing ferric chloride (8 parts), followed by stirring for 10 hours. The resulting reaction product was collected on a filter and washed to obtain a monoazo compound of the following formula.

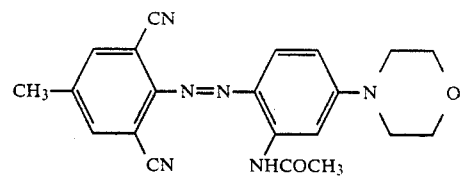

The maximum absorption wave length (λ max) of the monoazo compound in dimethylformamide was found to be 523 nm.

The monoazo compound obtained (1.0 part) was subjected to fine pulverization with the aid of a naphthalenesulfonic acid/formaldehyde condensate (3.0 parts) in an aqueous medium. The resulting dye dispersion was dried to obtain a powder.

Tetron® jersey (polyester knittings, a product of Teijin Co., 10 parts) was dipped into a dye bath containing the powder obtained above (0.6 part), and dyeing was continued for 60 minutes at 130° to 135° C. under pressure. Thereafter, the dyed cloth was subjected to reduction rinsing treatment at 85° C. for 10 minutes in a solution containing sodium hydroxide (3 parts), hydrosulfite (3 parts), a betaine type amphoteric surfactant (3 parts) and water (3000 parts), followed by washing with water and drying, thereby obtaining a dyed product of a brilliant bluish red. The dyed product was found to have superior light, sublimation and wet fastness properties.

The 3-acetylaminophenylmorpholine used in the above as the coupling component was prepared by heating a mixture of 3-aminoacetanilide and excess amounts of 2,2'-dichloroethyl ether at 130° to 140° C. in the presence of sodium carbonate.

EXAMPLE 2

Example 1 was repeated except that 3-propionylaminophenylmorpholine was used in place of the 3-acetylaminophenylmorpholine, thereby obtaining a monoazo compound of the following formula.

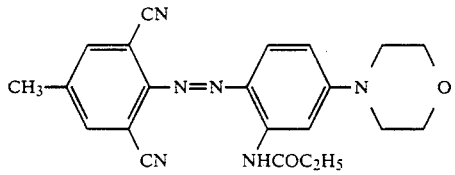

The maximum absorption wave length (λ max) of the monoazo compound was found to be 524 nm in DMF.

Using the monoazo compound obtained above, dyeing of polyester knittings was carried out in a manner similar to that of Example 1, thereby obtaining a dyed product of a brilliant bluish red color superior in light, sublimation and wet fastness properties.

EXAMPLE 3

In a manner similar to that of Example 1, a monoazo compound of the following formula,

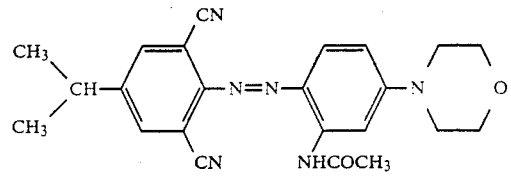

$\lambda_{max}^{DMF}$ 524 nm, was obtained.

Using the monoazo compound, dyeing of polyester knittings was carried out in a manner similar to that of Example 1, thereby obtaining a dyed product of a brilliant bluish red superior in fastness properties.

EXAMPLE 4

According to the procedure described in Example 1, 4-chloro-2,6-dibromoaniline (12 parts) was diazotized, followed by coupling with 3-methylphenylmorpholine (7 parts), and the resulting o-halogenomonoazo compound was allowed to react with cuprous cyanide (8.5 parts) in N-methylpyrrolidone (100 parts), thereby obtaining a monoazo compound of the following formula,

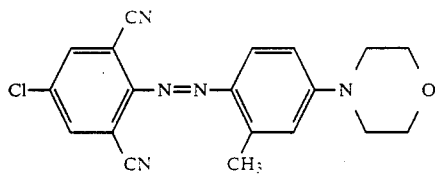

$\lambda_{max}^{DMF}$ 516 nm.

Using the monoazo compound obtained above, dyeing of polyester knittings was carried out in a manner similar to that of Example 1, thereby otaining a dyed product of a brilliant red color superior in various fastness properties.

EXAMPLES 5 to 57

A diazo component as shown in the column A of the following table was diazotized, followed by coupling with a coupling component as shown in the column B, and the resulting o-halogenomonoazo compound was then allowed to react with cuprous cyanide, thereby obtaining a monoazo compound as shown in the column C, which was found have the $\lambda_{max}^{DMF}$ as shown in the column D.

Using the monoazo compound obtained, dyeing of polyester fiber was carried out in a manner similar to that of Example 1, thereby obtaining a dyed product of a brilliant color as shown in the column E of the following table, which was superior in fastness properties.

TABLE 1
| Example No. | A Diazo component | B Coupling component | C Monoazo compound | D $\lambda_{max}^{DME}$ (nm) | E Color on polyester fiber |
|---|---|---|---|---|---|
| 5 | 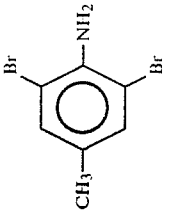 | 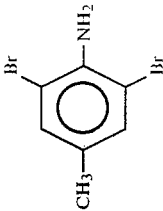 | 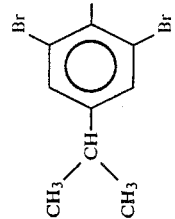 | 529 | Bluish red |
| 6 | 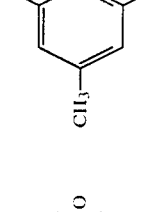 | 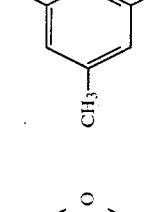 | 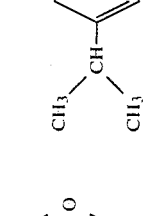 | 513 | Red |
| 7 |  |  | 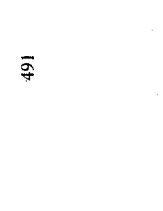 | 491 | Yellowish red |
| 8 |  |  | 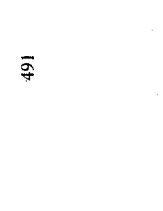 | 522 | Bluish red |
| 9 |  |  | 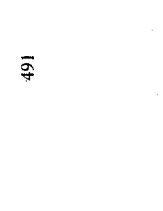 | 476 | Orange |

TABLE 1-continued

| Example No. | A Diazo component | B Coupling component | C Monoazo compound | D $\lambda_{max}^{DMF}$ (nm) | E Color on polyester fiber |
|---|---|---|---|---|---|
| 10 | 2,4,6-tribromoaniline | 3-(NHCOCH$_2$Cl)-morpholinoaniline | Br/CN/NHCOCH$_2$Cl-morpholino monoazo | 554 | Reddish violet |
| 11 | 2,6-dibromo-4-iodoaniline | 3-(NHCO$_2$CH(CH$_3$)$_2$)-morpholinoaniline | I/CN/NHCO$_2$CH(CH$_3$)$_2$-morpholino monoazo | 550 | Reddish violet |
| 12 | 2,6-dibromo-4-methoxyaniline | 3-(NHCOCH$_3$)-morpholinoaniline | CH$_3$O/CN/NHCOCH$_3$-morpholino monoazo | 527 | Bluish red |
| 13 | 2,6-dibromo-4-ethoxyaniline | 3-(NHCOCH$_2$CH$_2$Cl)-morpholinoaniline | C$_2$H$_5$O/CN/NHCOCH$_2$CH$_2$Cl-morpholino monoazo | 528 | Bluish red |
| 14 | 4-(CH$_3$)$_3$CO-aniline | 3-methyl-morpholinoaniline | (CH$_3$)$_3$CO/CN/CH$_3$-morpholino monoazo | 497 | Yellowish red |

TABLE 1-continued

| Example No. | A Diazo component | B Coupling component | C Monoazo compound | D $\lambda_{max}^{DMF}$ (nm) | E Color on polyester fiber |
|---|---|---|---|---|---|
| 15 | 4-$CH_3SO_2$-2,6-dibromoaniline | 3-methyl-N-morpholinoaniline (morpholino at 1, $CH_3$ at 3) | 2,6-dicyano-4-$CH_3SO_2$-phenyl azo coupled to 3-methyl-4-morpholinophenyl | 536 | Bluish red |
| 16 | 4-$CH_3SO_2$-2,6-dichloroaniline | 3-$NHCOOC_2H_5$-N-morpholinoaniline | 2,6-dicyano-4-$CH_3SO_2$-phenyl azo coupled to 3-$NHCO_2C_2H_5$-4-morpholinophenyl | 548 | Reddish violet |
| 17 | 4-(isopropylsulfonyl)-2,6-dibromoaniline ($CH(CH_3)_2SO_2$) | 3-Cl-N-morpholinoaniline | 4-$(CH_3)_2CHSO_2$-phenyl azo coupled to 3-Cl-4-morpholinophenyl | 520 | Red |
| 18 | 4-$CF_3$-2,6-dibromoaniline | 3-methyl-N-morpholinoaniline | 2,6-dicyano-4-$CF_3$-phenyl azo coupled to 3-methyl-4-morpholinophenyl | 533 | Bluish red |
| 19 | 4-$C_2H_5OCO$-2,6-dibromoaniline | 3-$NHCO_2CH_3$-N-morpholinoaniline | 2,6-dicyano-4-$C_2H_5OCO$-phenyl azo coupled to 3-$NHCO_2CH_3$-4-morpholinophenyl | 561 | Violet |

TABLE 1-continued
| Example No. | A Diazo component | B Coupling component | C Monoazo compound | D $\lambda_{max}^{DMF}$ (nm) | E Color on polyester fiber |
|---|---|---|---|---|---|
| 20 | 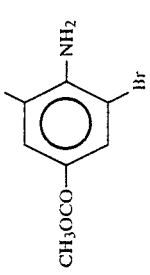 | 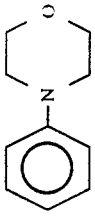 | 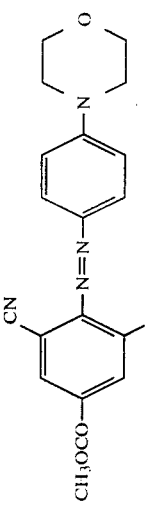 | 532 | Bluish red |
| 21 | 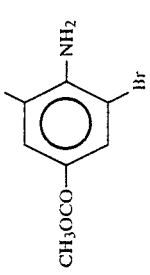 | 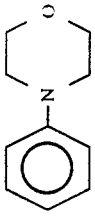 | 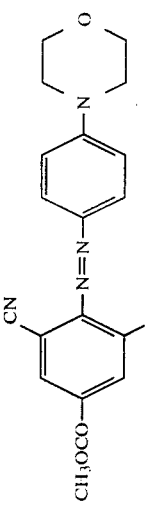 | 527 | Red |
| 22 | 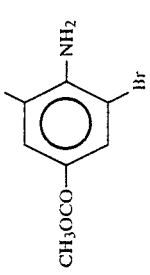 | 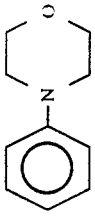 | 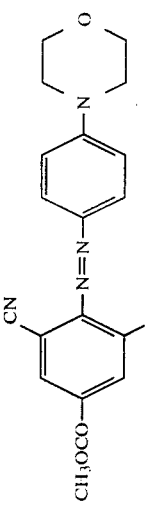 | 546 | Reddish violet |
| 23 | 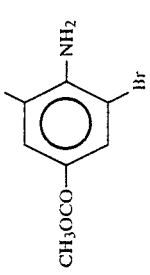 | 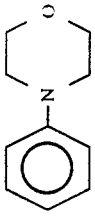 | 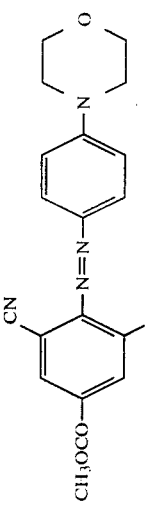 | 523 | Red |
| 24 | 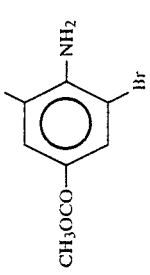 | 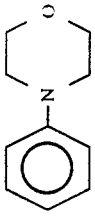 | 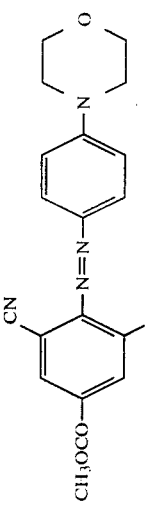 | 542 | Reddish violet |

TABLE 1-continued

| Example No. | A Diazo component | B Coupling component | C Monoazo compound | D $\lambda_{max}^{DMF}$ (nm) | E Color on polyester fiber |
|---|---|---|---|---|---|
| 25 | 2,4,6-tricyanoaniline (NC, CN, CN, NH₂) | 3-NHCOCH₃-phenyl-morpholine | (NC)(CN)(CN)-C₆H-N=N-C₆H₃(NHCOCH₃)-morpholine | 588 | Reddish blue |
| 26 | 2-Cl-6-Br-aniline | phenyl-morpholine | 2,6-(CN)₂-C₆H₃-N=N-C₆H₄-morpholine | 463 | Yellowish orange |
| 27 | 2,6-Cl₂-4-NO₂-aniline | phenyl-morpholine | 2,6-(CN)₂-4-NO₂-C₆H-N=N-C₆H₄-morpholine | 566 | violet |
| 28 | 2-CN-6-Cl-4-NO₂-aniline | 3-CH₃-phenyl-morpholine | 2,6-(CN)₂-4-NO₂-C₆H-N=N-C₆H₃(CH₃)-morpholine | 581 | Reddish blue |
| 29 | 2-CN-6-I-4-NO₂-aniline | 2-Cl-5-NHCOCH₃-phenyl-morpholine | 2,6-(CN)₂-4-NO₂-C₆H-N=N-C₆H₂(Cl)(NHCOCH₃)-morpholine | 599 | Blue |

TABLE 1-continued
| Example No. | A Diazo component | B Coupling component | C Monoazo compound | D $\lambda_{max}^{DMF}$ (nm) | E Color on polyester fiber |
|---|---|---|---|---|---|
| 30 | 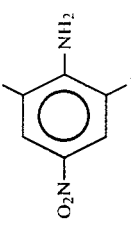 | 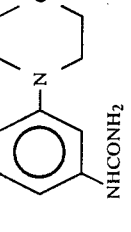 | 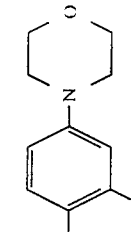 | 615 | Blue |
| 31 | 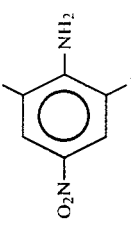 | 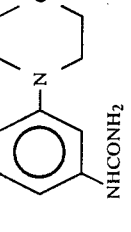 | 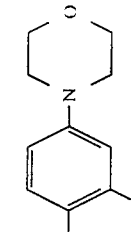 | 623 | Greenish blue |
| 32 | 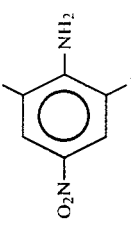 | 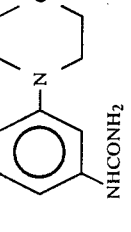 | 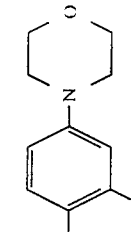 | 624 | Greenish blue |
| 33 | 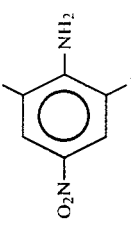 | 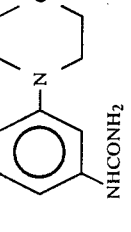 | 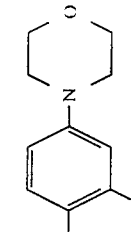 | 607 | Blue |
| 34 | 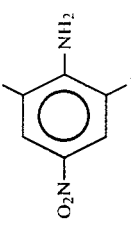 | 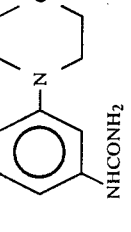 | 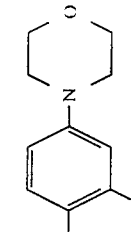 | 611 | Blue |

TABLE 1-continued
| Example No. | A Diazo component | B Coupling component | C Monoazo compound | D $\lambda_{max}^{DMF}$ (nm) | E Color on polyester fiber |
|---|---|---|---|---|---|
| 35 | 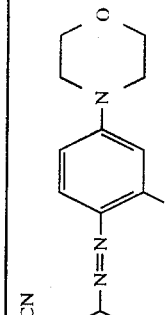 | 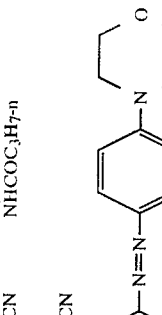 | 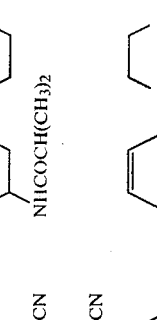 | 611 | Blue |
| 36 | 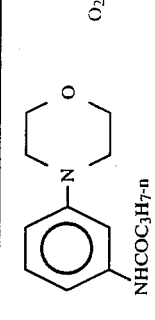 | 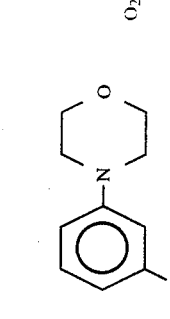 | 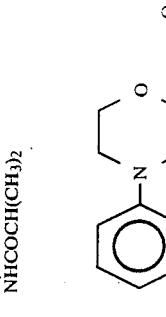 | 611 | Blue |
| 37 | 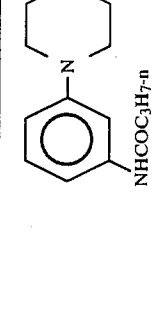 | 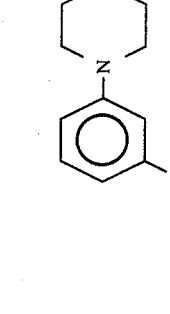 | 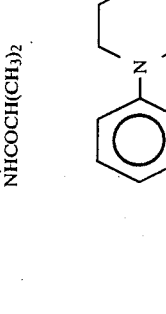 | 609 | Blue |
| 38 |  |  |  | 611 | Blue |
| 39 | 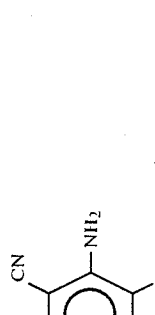 |  |  | 628 | Greenish blue |

TABLE 1-continued
| Example No. | A Diazo component | B Coupling component | C Monoazo compound | D $\lambda_{max}^{DMF}$ (nm) | E Color on polyester fiber |
|---|---|---|---|---|---|
| 40 | 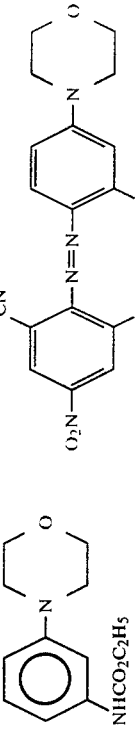 | 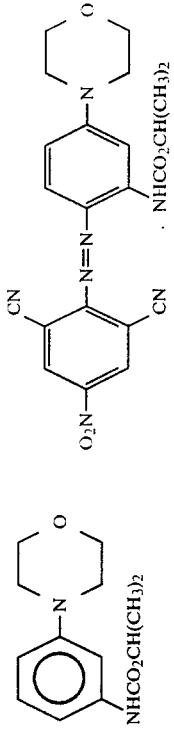 | 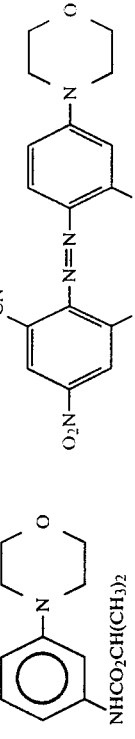 | 608 | Blue |
| 41 | | | | 609 | Blue |
| 42 | | | | 609 | Blue |
| 43 | | | | 609 | Blue |
| 44 | | | | 626 | Blue |

TABLE 1-continued
| Example No. | A Diazo component | B Coupling component | C Monoazo compound | D $\lambda_{max}^{DME}$ (nm) | E Color on polyester fiber |
|---|---|---|---|---|---|
| 45 |  | 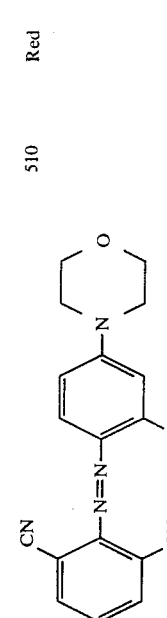 | 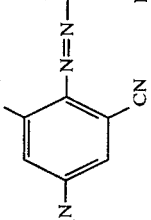 | 609 | Blue |
| 46 | 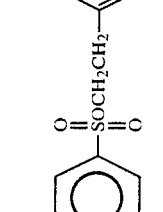 | 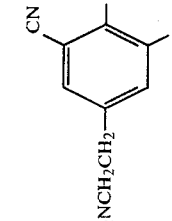 | 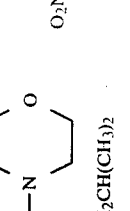 | 510 | Red |
| 47 | 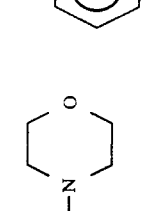 | 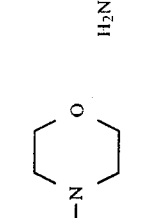 | 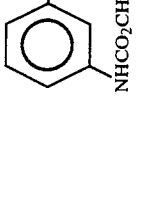 | 491 | Yellowish red |
| 48 | 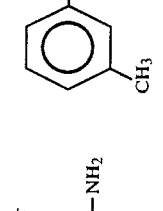 | 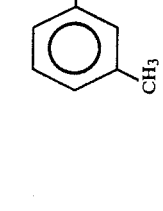 | 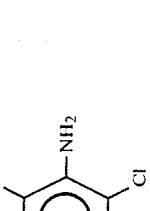 | 516 | Red |
| 49 | 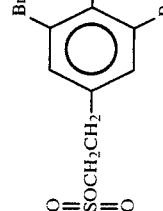 | 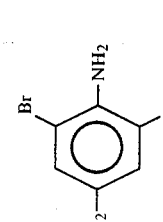 | | 530 | Red |

TABLE 1-continued

| Example No. | A Diazo component | B Coupling component | C Monoazo compound | D $\lambda_{max}^{DMF}$ (nm) | E Color on polyester fiber |
|---|---|---|---|---|---|
| 50 | 2,6-dibromo-4-(C$_2$H$_5$OCH$_2$CHCH$_2$-OH)aniline | 3-NHCOCH$_3$, 4-morpholino phenyl | corresponding azo with CN, CN, morpholino, NHCOCH$_3$ | 526 | Red |
| 51 | 2,6-dibromo-4-[(CH$_3$)$_2$NCH$_2$CH$_2$]aniline | 3-CH$_3$, 4-morpholino phenyl | corresponding azo | 497 | Yellowish red |
| 52 | 2,6-dibromo-4-HOCH$_2$-aniline | 3-NHCOCH$_3$, 4-morpholino phenyl | corresponding azo | 528 | Red |
| 53 | 2,6-dibromo-4-BrCH$_2$CH$_2$-aniline | 3-NHCOCH$_3$, 4-morpholino phenyl | corresponding azo | 525 | Red |
| 54 | 2,6-dibromo-4-(C$_2$H$_5$OCOCH$_2$)aniline | 3-NHCOCH$_3$, 4-morpholino phenyl | corresponding azo | 525 | Red |

TABLE 1-continued
| Example No. | A Diazo component | B Coupling component | C Monoazo compound | D $\lambda_{max}^{DME}$ (nm) | E Color on polyester fiber |
|---|---|---|---|---|---|
| 55 | 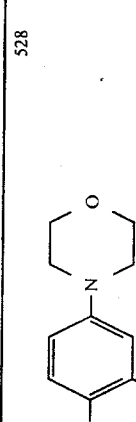 |  |  | 528 | Red |
| 56 |  |  |  | 495 | Yellowish red |
| 57 |  |  |  | 495 | Yellowish red |

EXAMPLE 58

2-Amino-3-bromo-5-nitrobenzonitrile (13 parts) was dispersed in 78% sulfuric acid (50 parts). To the dispersion was added 43% nitrosylsulfuric acid (16 parts) at a temperature between 0° to 5° C. under ice cooling to perform diazotization. The resulting diazonium salt solution was added to a 5% hydrochloric acid solution (100 parts) containing 3-acetylaminophenylmorpholine (11 parts), while keeping the temperature within a range of 0° to 5° C., performing the coupling reaction. The resulting o-halogenomonoazo compound was dissolved in N,N-dimethylformamide (200 parts). To this solution was added cuprous chloride (5 parts), and the mixture was allowed to react at 80° C. for 8 hours. After cooling, the crystals separated were dispersed in 10% ammonia water (150 parts), and the dispersion was stirred for 15 hours at 30° C., followed by filtration and washing. Thus, a monoazo compound of the following formula,

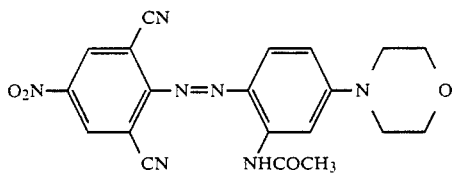

was obtained. The $\lambda_{max}^{DMF}$ of the monoazo compound was found to be 610 nm.

The monoazo compound (1.3 parts) was subjected to fine pulverization with the aid of lignin sulfonic acid (3.7 parts), and the resulting dispersion was mixed with hot water (35 parts) and a half emulsion (60 parts) having the composition as described below to prepare a printing paste.

| | |
|---|---|
| O/W Emulsion | 300 parts |
| Maypro gum NP 12% paste | 694 parts |
| Sodium chlorate | 4 parts |
| Tartaric acid | 2 parts |
| Total | 1000 parts |

Tetron ® tropical (polyester fabric, a product of Teijin Co.) was printed with the printing paste prepared above, and the printed fabric was steamed at 170° C. for 7 minutes under atmospheric pressure using a high temperature steamer, followed by the reduction rinsing treatment, washing with water and then drying in the same manner as in Example 1. Thus, a printed product of a brilliant blue color superior in light, sublimation and wet fastness properties was obtained.

What is claimed is:

1. A monoazo compound of the following formula,

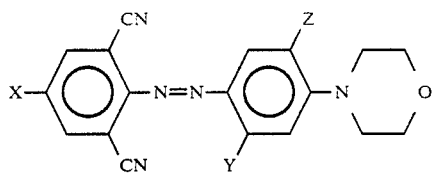

wherein X is halogen or $C_{1-4}$ alkyl; Y is hydrogen, chlorine, methyl or —NHCOR in which R is $C_{1-4}$ alkyl, $C_{1-4}$ alkoxy, amino, chloromethyl or chloroethyl; and Z is hydrogen, chlorine, methyl, methoxy or ethoxy.

2. The monoazo compound according to claim 8, wherein the compound has halogen or $C_{1-4}$ alkyl as X, methyl or —NHCOR as Y and hydrogen as Z.

3. The monoazo compound according to claim 8, wherein the compound has halogen as X, methyl as Y and hydrogen as Z.

4. The monoazo compound according to claim 8, wherein X is $C_1$-$C_4$ alkyl; Y is —NHCOR; and Z is hydrogen.

* * * * *